United States Patent
Itoh et al.

(10) Patent No.: US 7,738,128 B2
(45) Date of Patent: Jun. 15, 2010

(54) NETWORK DEVICE, DEVICE LINK SYSTEM, AND DEVICE LINK METHOD

(75) Inventors: Atsuhiro Itoh, Saitama (JP); Hideaki Sugimoto, Saitama (JP); Eiji Shimoichi, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1186 days.

(21) Appl. No.: 11/332,223

(22) Filed: Jan. 17, 2006

(65) Prior Publication Data
US 2007/0058194 A1    Mar. 15, 2007

(30) Foreign Application Priority Data
Sep. 14, 2005    (JP) .............................. 2005-266960

(51) Int. Cl.
*G06F 3/12*    (2006.01)
(52) U.S. Cl. .................... 358/1.15; 358/434; 715/239; 710/15; 717/162
(58) Field of Classification Search ................ 358/1.15, 358/434; 715/239; 710/15; 717/162
See application file for complete search history.

(56) References Cited

U.S. PATENT DOCUMENTS

| 2004/0066528 | A1* | 4/2004 | Nutt et al. ................. 358/1.15 |
| 2005/0022120 | A1* | 1/2005 | Takahashi .................. 715/522 |
| 2005/0097235 | A1* | 5/2005 | Dehart ........................ 710/15 |
| 2007/0013949 | A1* | 1/2007 | Jeong ......................... 358/1.15 |
| 2007/0226725 | A1* | 9/2007 | Sato ........................... 717/162 |
| 2008/0010369 | A1* | 1/2008 | Hwang ....................... 709/223 |
| 2008/0259382 | A1* | 10/2008 | Mihara ...................... 358/1.15 |

FOREIGN PATENT DOCUMENTS

JP    A 2000-047771    2/2000

* cited by examiner

*Primary Examiner*—Kimberly A Williams
(74) *Attorney, Agent, or Firm*—Oliff & Berridge, PLC

(57) ABSTRACT

In a device link system for connecting a first device and a second device through a communication interface, the first device comprises a network connection unit that connects the first device to a network; a web server that delivers a web page describing first device information relating to the first device via the network connection unit; an acquisition unit that acquires second device information relating to the second device from the second device via the communication interface; and a web page processor that generates a page describing the second device information acquired by the acquisition unit and adds the generated page to the web page, and the second device comprises a provision unit that provides the second device information to the first device via the communication interface upon receiving a request for the second device information from the first device.

19 Claims, 10 Drawing Sheets ued States Patent

US 7,738,128 B2

NETWORK DEVICE, DEVICE LINK SYSTEM, AND DEVICE LINK METHOD

BACKGROUND OF THE INVENTION

1. Field of the Invention

The present invention relates to a device, a device link system, and a device link method, and more particularly to a device, a device link system, and a device link method utilizing an EWS (Embedded Web Server) function.

2. Description of the Related Art

Conventionally, there have been known information processing systems and methods which are able to realize a network copying function to read an image by means of a scanner connected to the network and to cause an arbitrarily desired printer to print out the image, with simple operations similar to operations for an all-in-one type copying machine (see Japanese Patent Application Publication No. 2000-47771, for example).

Recent developments in technology have incorporated an EWS function into network devices such as scanners and printers. As a result, a user can access the EWS of such device by entering an IP address of the device as a URL into a web browser on a PC (Personal Computer) or the like. The user is thus allowed to check the state, setting information, job history and so on of the device, through the web browser. In addition, since the user can access EWSs of other devices through the EWS of his/her operating device as well as through the PC's web browser, it is possible to check the state, setting information, and job history of other devices through the EWS of his/her operating device.

However, in order to access the EWS of a device, the user is required to enter the IP address of the device. This means that the user is obliged to do a troublesome work to find out the IP address of the device to be accessed.

SUMMARY OF THE INVENTION

The present invention has been made in view of the above circumstances and provides a device, a device link system, and a device link method, that do not oblige the user to do troublesome work, such as finding out an IP address.

According to an aspect of the present invention, in a device link system for connecting a first device and a second device through a communication interface, the first device comprises a network connection unit that connects the first device to a network; a web server that delivers a web page describing first device information relating to the first device via the network connection unit; an acquisition unit that acquires second device information relating to the second device from the second device via the communication interface; and a web page processor that generates a page describing the second device information acquired by the acquisition unit and adds the generated page to the web page, and the second device comprises a provision unit that provides the second device information to the first device via the communication interface upon receiving a request for the second device information from the first device.

With the above configuration, the user is allowed to use the device comfortably without being obliged to do a troublesome work such as finding out an IP address, and the user is allowed to use an EWS operation menu for a device having no network function.

BRIEF DESCRIPTION OF THE DRAWINGS

Embodiments of the present invention will be described in detail based on the following figures, wherein.

DETAILED DESCRIPTION OF THE INVENTION

A detailed description will now be made of embodiments of a device, a device link system, and a device link method according to the present invention, with reference to the accompanying drawings.

First Embodiment

Figure 1:
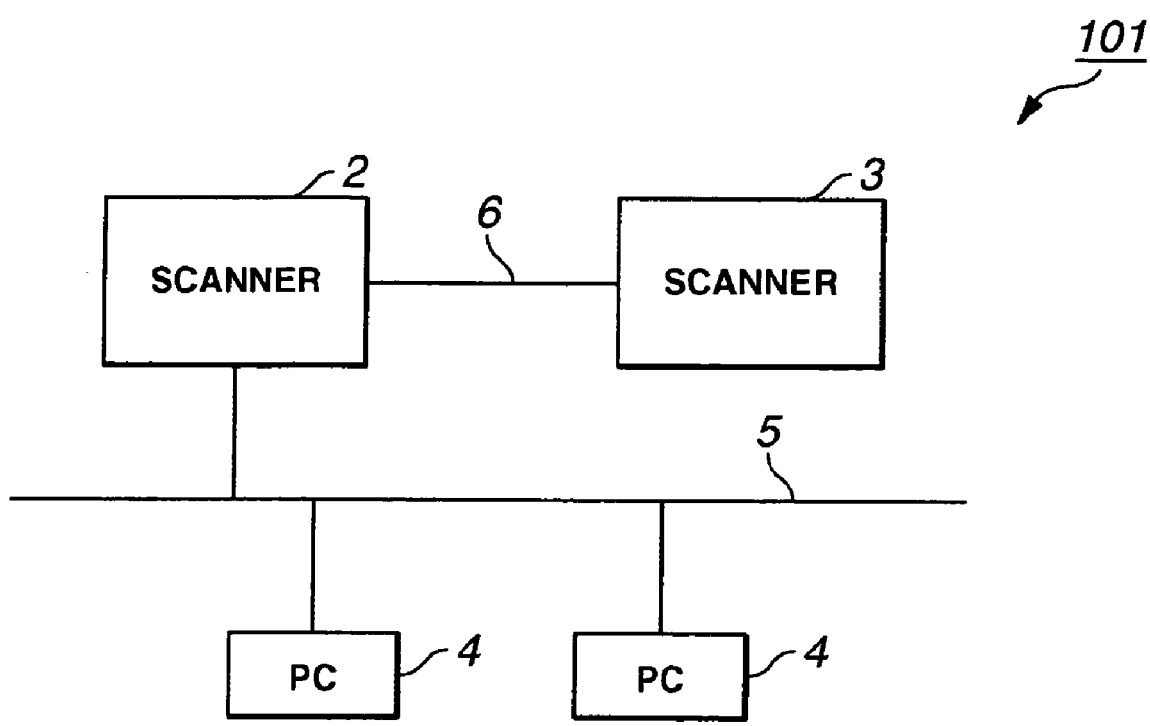
FIG. 1 shows a system configuration for a device link system according to a first embodiment of the present invention.

FIG. 1 shows a system configuration for a device link system 101 according to a first embodiment of the present invention.

As shown in FIG. 1, the device link system 101 includes a scanner 2, a printer 3, and plural PCs 4, that are the devices according to the present invention. The scanner 2 and the PCs 4 are connected to a network 5. Further, the scanner 2 and the PCs 4 are P2P connected to each other through a USB (Universal Serial Bus) cable 6.

The system as shown in FIG. 1 is called a scanner-printer system, in which the scanner 2 and the printer 3 are coupled with a loose coupling interface such as a USB interface in terms of both software and hardware. In this scanner-printer system, the printer 3 is not provided with any special software or hardware exclusively for connecting the scanner 2, so that the printer 3 can be provided to users at a moderate price.

The scanner 2 performs scan processing to scan an original document to generate image data, and to process the image data. The scanner 2 is connected to the printer 3 through the USB cable 6, and connected to the plural PCs 4 through the network 5.

The printer 3 performs print processing to convert the image data to bit-mapped image, and to form the bit-mapped image on a medium such as a paper sheet. The printer 3 is connected to the scanner 2 through the USB cable 6, but has no network function. The printer 3 has a function to directly print out the image data scanned by the scanner 2, without using a driver.

Figure 2:
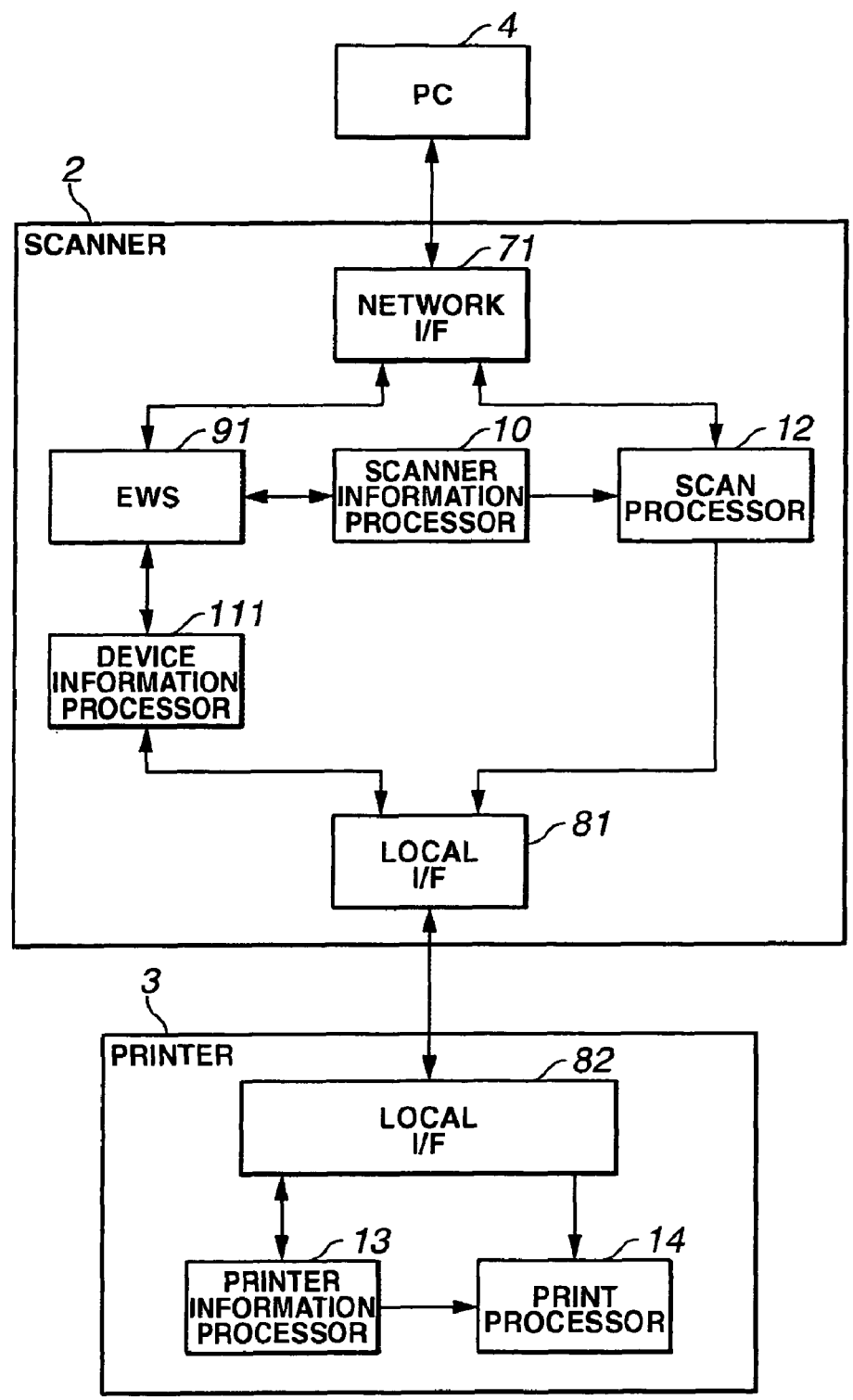
FIG. 2 is a block diagram illustrating an example of a functional configuration of the scanner and the printer shown in FIG. 1.

FIG. 2 is a block diagram showing an example of functional configuration of the scanner 2 and the printer 3 shown in FIG. 1.

As shown in FIG. 2, the scanner 2 includes a network I/F 71, a local I/F 81, an EWS 91, a scanner information processor 10, a device information processor 111, and a scan processor 12.

The network I/F 71 is a data communication interface that can be connected to the network 5 such as Internet or Intranet. In this embodiment, the scanner 2 communicates data with the plural PCs 4 on the network 5 via the network I/F 71.

The local I/F 81 is a data communication interface that can be connected to a wire circuit such as an IEEE (the Institute of Electrical and Electronic Engineers) 1394 Cable, a USB cable 6, or an RS-232C Cable, as well as to a wireless circuit such as a wireless LAN or an IrDA (Infrared Data Association). In this embodiment, the scanner 2 communicates data with the printer 3 that is USB connected thereto via the local I/F 81.

The EWS 91 has a similar function to that of a web server. Specifically, the EWS 91 accumulates web pages written in HTML (Hyper Text Markup Language) or the like on information relating to the state, setting information, and job history of the scanner (hereafter, to be collectively referred to as the "scanner information") held by the scanner information processor 10, and transmits the web pages in response to a request from a client software such as a web browser.

The device information processor 111 performs processing to acquire the state, setting information, and job history of a device that is USB connected thereto via the local I/F 81 from the device, and processing to instruct the device to change the device information. In this embodiment, the device that is USB connected to the scanner 2 via the local I/F 81 is a printer 3. Hereafter, the state, setting information, and job history of the printer 3 shall be collectively referred to as the "printer information".

The scan processor 12 performs scan processing according to setting information of the scanner held by the scanner information processor 10.

As shown in FIG. 2, the printer 3 includes a local I/F 82, a printer information processor 13, and a print processor 14.

The local I/F 82 is a data communication interface that can be connected to a wire circuit such as IEEE 1394 Cable, the USB cable 6, or an RS-232C Cable, as well as to a wireless circuit such as a wireless LAN or IrDA. According to this embodiment, the printer 3 communicates data with the scanner 2 that is USB connected thereto via the local I/F 82.

The printer information processor 13 holds the printer information, and also performs processing to notify the scanner 2 of the printer information when receiving a request for the printer information from the scanner 2, and to change the printer information when instructed by the scanner 2 to change the same.

The print processor 14 performs print processing according to printer setting information or the like held by the printer information processor 13.

Figure 3:
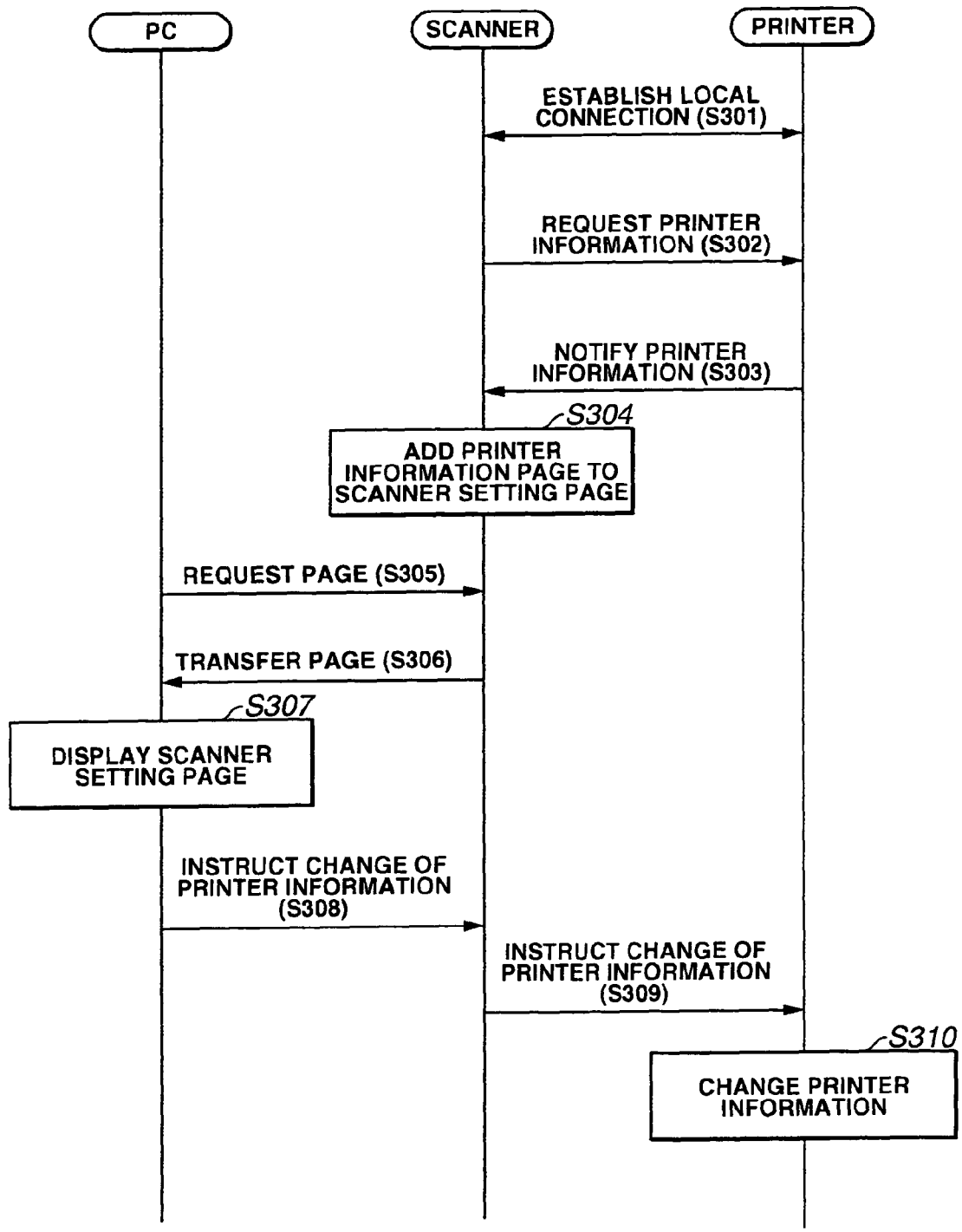
FIG. 3 is a sequence diagram illustrating the sequence of processing steps of the PC, the scanner, and the printer in the device link system according to the first embodiment.

A description will now be made on the sequence of processing steps of the PC, the scanner, and the printer of the device link system, with reference to the sequence diagram of FIG. 3.

When the scanner and the printer are connected through the USB cable, local connection is established between the scanner and the printer (step S301).

The device information processor of the scanner requests the printer for printer information (step S302).

Upon the printer receiving the request for printer information from the scanner, the printer information processor of the printer notifies the scanner of the printer information (step S303).

Upon the scanner receiving the printer information from the printer, the device information processor of the scanner adds a page describing the printer information to a web page describing scanner information (hereafter, to be referred to as the "scanner setting page"), based on the printer information (step S304).

The PC then requests the scanner for the scanner setting page (step S305), and the EWS of the scanner transfers the scanner setting page to the PC (step S306).

Upon receiving the scanner setting page from the scanner, the PC displays the scanner setting page (step S307).

If the PC changes the printer information on a page describing the printer information added to the scanner setting page, the PC instructs the scanner to change the printer information (step S308).

Upon the scanner receiving the instruction to change the printer information from the PC, the device information processor of the scanner instructs the printer to change the printer information (step S309).

Upon the printer receiving the instruction to change the printer information from the scanner, the printer information processor of the printer changes the printer information according to the instruction (step S310).

A description will now be made on scanner setting pages managed by the EWS, with reference to FIGS. 4A to 4C.

Figure 4A:
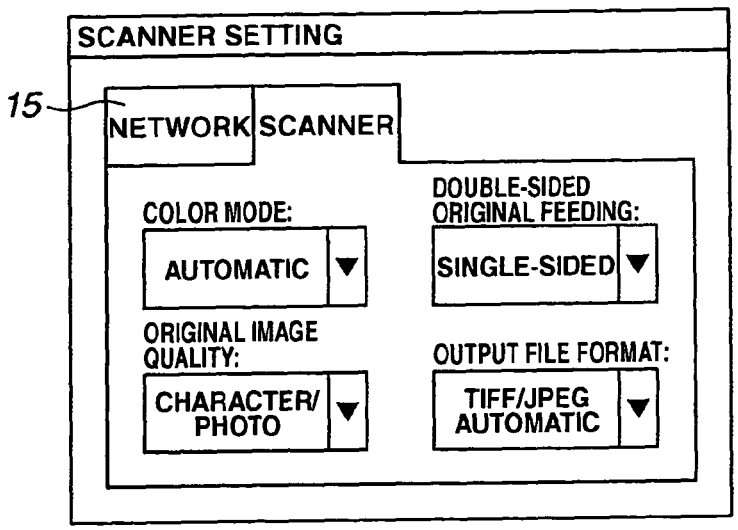
FIGS. 4A to 4C are diagrams illustrating scanner setting pages managed by the EWS according to the first embodiment.

FIG. 4A shows an example of a scanner setting page managed by the EWS of the scanner that is not connected to the printer.

As shown in FIG. 4A, the scanner setting page displays a page relating to scanner information, in which there are displayed a combo box for setting a color mode, a combo box for setting double-sided original feeding function, a combo box for setting an image quality of the original document, and a combo box for setting an output file format. A "network" tab 15 can be operated (clicked, for example) to switch over the display of the scanner setting page to a page relating to the network.

Figure 4B:
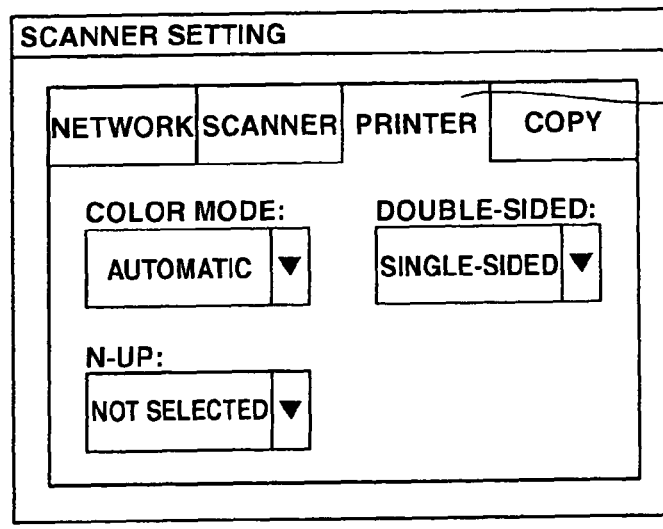

FIG. 4B shows an example of a scanner setting page managed by the EWS of the scanner connected to the printer.

When connected to the printer, the scanner acquires printer information from the printer, generates a page relating to the acquired printer information, and adds the generated page to the scanner setting page.

As shown in FIG. 4B, a "printer" tab 16 can be operated to switch the display of the scanner setting page to a page relating to the printer information. There are displayed, on this page, a combo box for setting a color mode, a combo box for setting double-sided printing, and a combo box for setting N-up function. Accordingly, the user is allowed to check or change the settings of the printer information, on the scanner setting page provided by the scanner's EWS.

Further, the scanner-printer system is often used as a substitution for a copying machine. Therefore, as shown in FIG. 4B, a page relating to copy setting information and copy job history (hereafter, to be collectively referred to as the "copy information") of the scanner-printer system may be added to the scanner setting page.

Figure 4C:
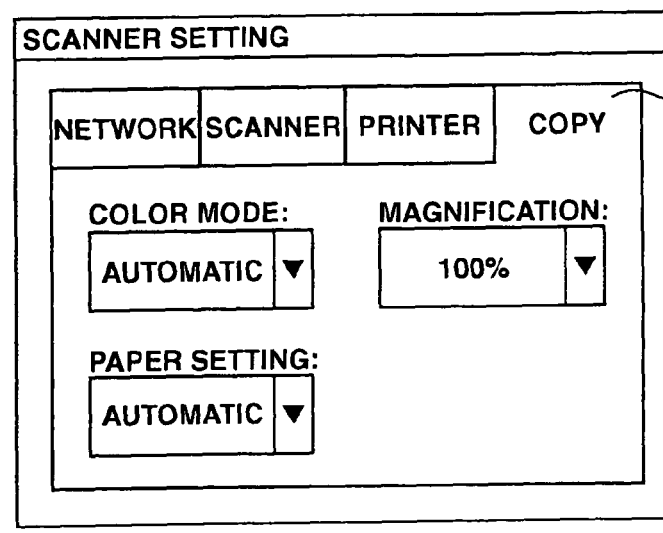

FIG. 4C shows an example of a scanner setting page on which a page relating to the copy information is displayed.

As shown in FIG. 4C, a "copy" tab 17 can be operated to switch the display of the scanner setting page to a page relating to the copy information. There are displayed, on this page, a combo box for setting a color mode, a combo box for setting a magnification, and a combo box for selecting a paper setting. Accordingly, the user is allowed to check or change the settings of the copy information, on the scanner setting page provided by the scanner's EWS.

The description of the first embodiment above has been made in terms of a case in which the EWS is provided in the scanner, and a page relating to the printer information is added to the scanner setting page generated by the scanner's EWS. However, the present invention is also applicable to a case in which the printer is provided with an EWS, and a page relating to scanner information is added to a printer setting page generated by the printer's EWS.

Second Embodiment

Figure 5:
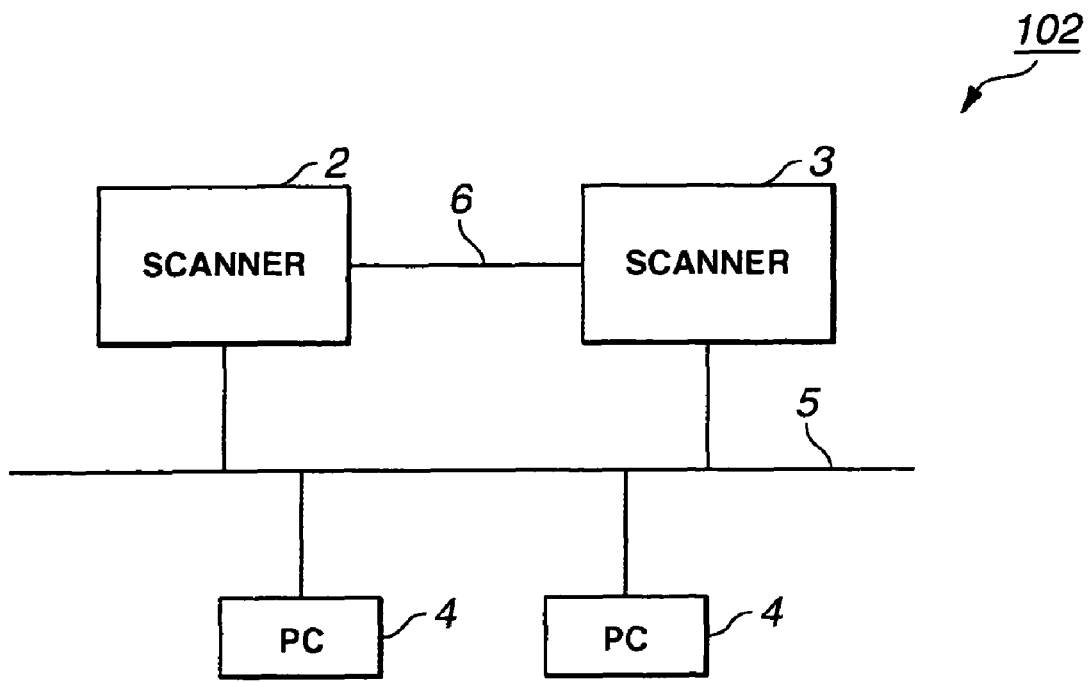
FIG. 5 shows a system configuration for a device link system according to a second embodiment of the present invention.

FIG. 5 shows a system configuration for a device link system 102 according to a second embodiment of the present invention.

As shown in FIG. 5, the device link system 102 includes a scanner 2, a printer 3, and PCs 4, which are the devices according to the present invention, and the scanner, the printer, and the PCs are connected through a network. The scanner and the printer are P2P (Peer to Peer) connected to each other via a USB (Universal Serial Bus) cable 6.

Specifically, the scanner 2 and the printer 3 are network connected through an Ethernet (registered trademark) cable or the like, and are also locally connected through a USB cable or the like.

The system as shown in FIG. 5 is called a scanner-printer system, in which the scanner 2 and the printer 3 are coupled with a loose coupling interface such as a USB interface in terms of both software and hardware. In this scanner-printer system, the printer 3 is not provided with any special software or hardware exclusively for connecting the scanner 2, so that the printer 3 can be provided to users at a moderate price.

The scanner 2 performs scan processing to scan an original document to generate image data, and to process the image data. The scanner 2 is connected to the printer 3 through the USB cable 6, and connected to the printer 3 and the PCs 4 through the network 5.

The printer 3 performs print processing to convert the image data to bit-mapped image, and to form the bit-mapped image on a medium such as a paper sheet. The printer 3 is connected to the scanner 2 through the USB cable 6, and connected to the scanner 2 and the PCs 4 through the network. The printer 3 has a function to directly print out the image data scanned by the scanner 2, without using a driver.

Figure 6:
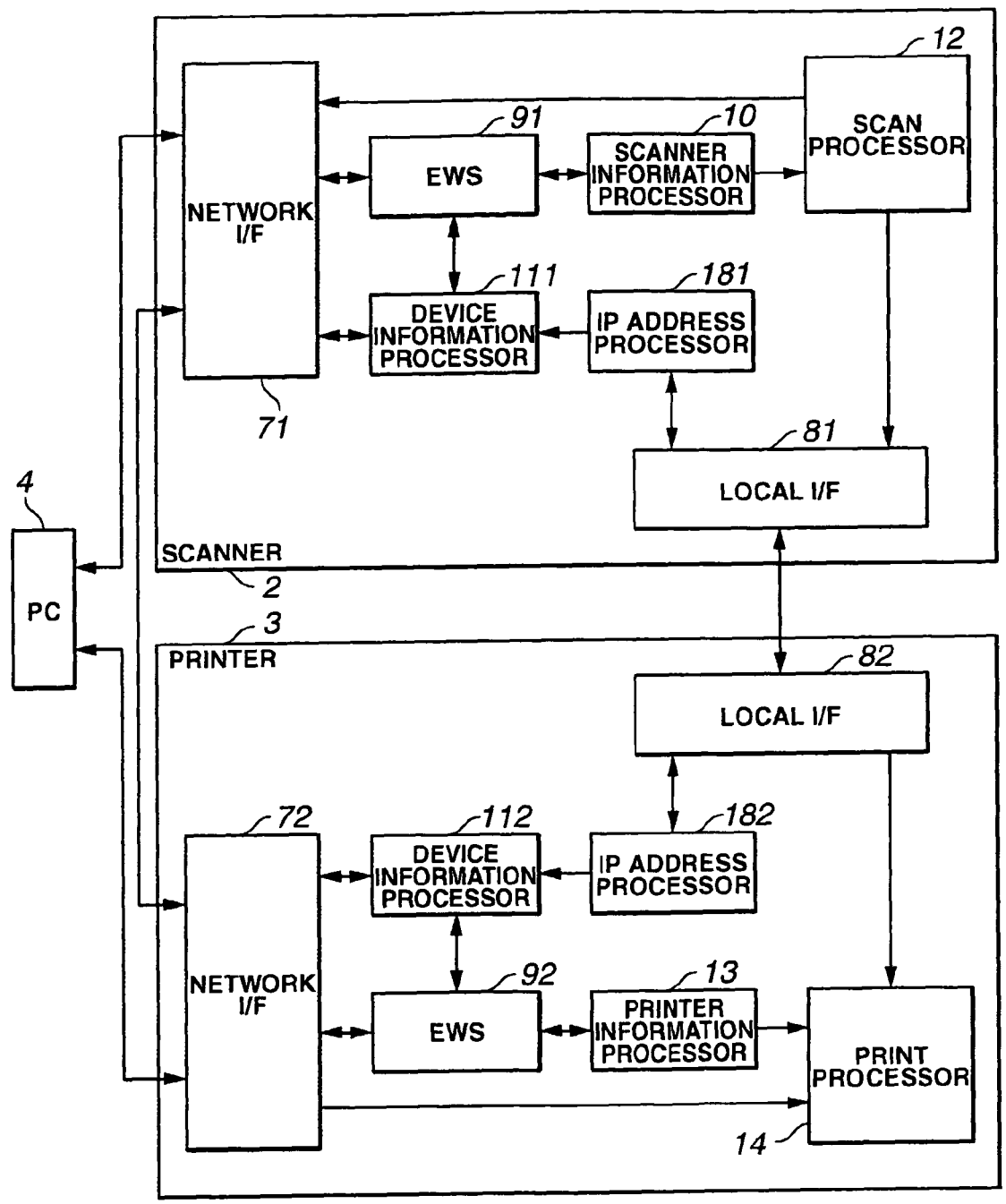
FIG. 6 is a block diagram illustrating an example of the functional configuration of the scanner and the printer shown in FIG. 5.

FIG. 6 is a block diagram showing an example of functional configuration of the scanner and the printer shown in FIG. 5.

As shown in FIG. 6, the scanner 2 includes a network I/F 71, a local I/F 81, an EWS 91, an IP address processor 181, a device information processor 111, a scanner information processor 10, and a scan processor 12.

The network I/F 71 is a data communication interface that can be connected to a network such as Internet or Intranet. In the second embodiment, the scanner communicates data with the printer and the PCs on the network through this network I/F 71.

The local I/F 81 is a data communication interface that can be connected to a wire circuit such as an IEEE 1394 cable, USB cable or RS-232C cable, and also to a wireless circuit such as a wireless LAN or IrDA. In this embodiment, the scanner 2 communicates data with the printer 3 that is USB connected thereto through this local I/F 81.

The EWS 91 has a similar function to that of a web server. Specifically, the EWS 91 accumulates web pages written in HTML (Hyper Text Markup Language) or the like and describing the state, setting information, and job history of the scanner (hereafter, to be collectively referred to as the "scanner information") held by the scanner information processor 10, and transmits the web pages in response to a request from a client software such as a web browser.

The IP address processor 181 performs processing to acquire the network IP address of a device to be USB connected through the local I/F 81, and also performs opposite processing to notify the USB connected device of the network IP address of the scanner.

The device information processor 111 performs processing to acquire page data relating to the state, setting information, and job history of a device, to which the scanner has been enabled to be connected through the network by using the acquired IP address, from the device through the network I/F 71. The device information processor 111 also performs processing to instruct the device to change the device information. In this second embodiment, the device that is USB connected to the scanner 2 via the local I/F 81 is the printer 3. Hereafter, the state, setting information, and job history of the printer 3 shall be collectively referred to as the "printer information"

The scanner information processor 10 performs processing to hold the scanner information, and to change the scanner information when instructed to change the same.

The scan processor 12 performs scan processing according to scanner setting information held by the scanner information processor.

As shown in FIG. 6, the printer 3 includes a network I/F 72, a local I/F 82, an EWS 92, an IP address processor 182, a device information processor 112, a printer information processor 13, and a print processor 14.

The network I/F 72 is a data communication interface that can be connected to a network such as Internet or Intranet. In this embodiment, the printer 3 communicates data with the scanner 2 and the PCs 4 on the network through the network I/F 72.

The local I/F 82 is a data communication interface that can be connected to a wire circuit such as IEEE 1394 Cable, USB cable, or RS-232C Cable, and also to a wireless circuit such as a wireless LAN or IrDA. According to this embodiment, the printer 3 communicates data with the scanner 2 that is USB connected thereto via the local I/F 82.

The EWS 92 has a similar function to that of a web server. Specifically, the EWS 92 accumulates web pages written in HTML (Hyper Text Markup Language) or the like relating to scanner information held by the printer information processor 13, and transmits the web pages in response to a request from a client software such as a web browser.

The IP address processor 182 performs processing to acquire the network IP address of a device to be USB connected through the local I/F 82, and also performs opposite processing to notify the USB connected device of the network IP address of the printer.

The device information processor 112 performs processing to acquire page data relating to the status, setting information, and job history of a device, to which the printer has been enabled to be connected through the network by using the acquired IP address, from the device through the network I/F 72. The device information processor 112 also performs processing to instruct the device to change the device information. In this second embodiment, the device that is USB connected to the printer 3 via the local I/F 82 is the scanner 2.

The printer information processor 13 performs processing to hold printer information, and to change the printer information when instructed to change the same by the scanner 2.

The print processor 14 performs print processing according to printer setting information held by the printer information processor 13.

Figure 7:
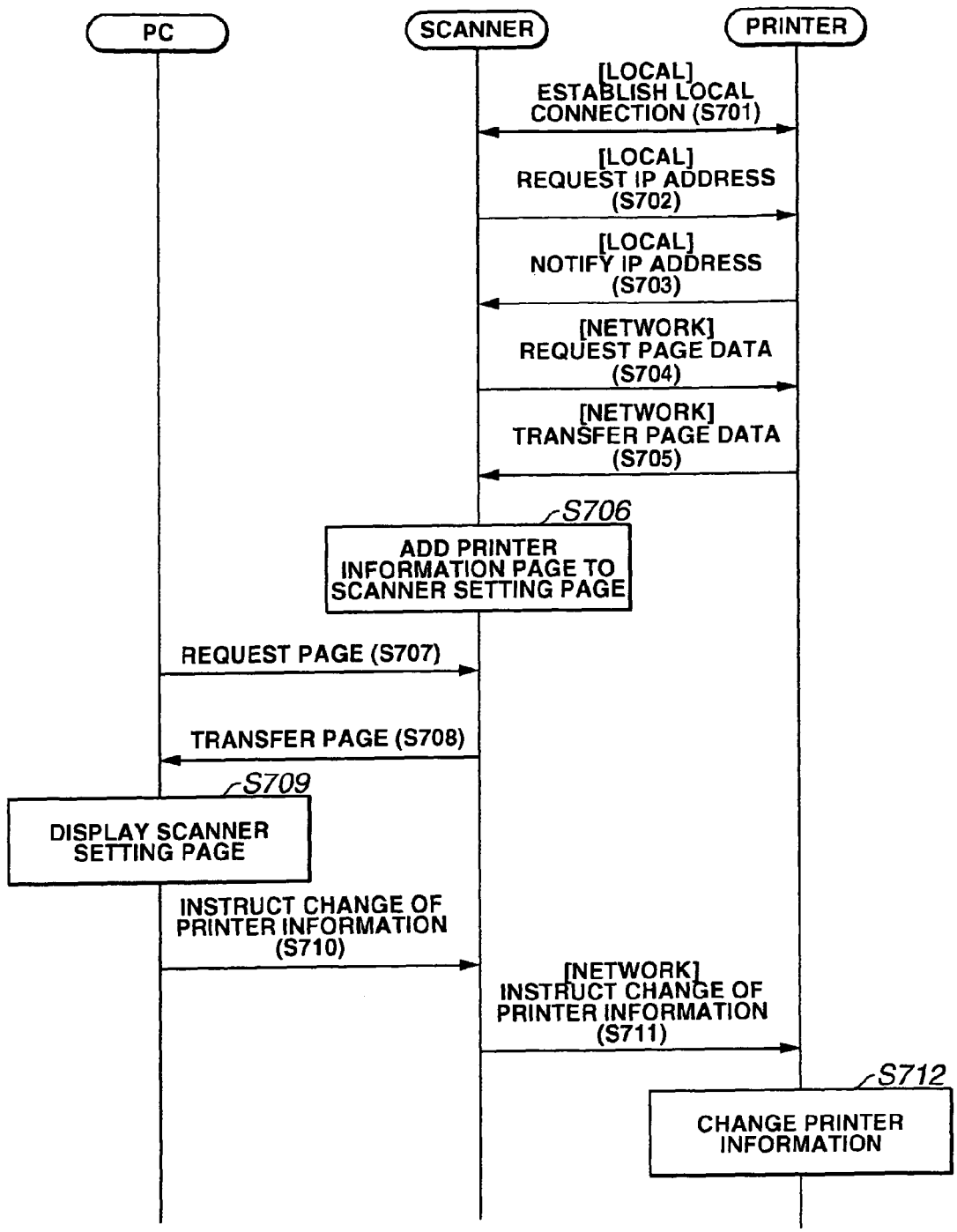
FIG. 7 is a sequence diagram illustrating the sequence of processing steps of the PC, the scanner, and the printer in the device link system according to the second embodiment.

A description will now be made of the sequence of processing steps of the PC, the scanner, and the printer in the device link system, with reference to the sequence diagram of FIG. 7. FIG. 7 shows the sequence of processing steps in terms of a case in which a web page describing scanner information to be transferred by the scanner's EWS (hereafter, to be referred to as the "scanner setting page") is transferred to the PC after adding page data relating to printer information thereto.

When the scanner and the printer are connected to each other through a USB cable, local connection is established between the scanner and the printer through the local I/F (step S701).

The IP address processor of the scanner requests the printer for the IP address of the printer through the local I/F (step S702).

Upon the printer receiving the request for the IP address from the scanner, the IP address processor of the printer notifies the scanner of the IP address through the local I/F (step S703).

Upon the scanner receiving the IP address from the printer, the device processor of the scanner requests the printer for page data relating to printer information through the network I/F, based on the IP address thus received (step S704).

Upon the printer receiving the request for page data relating to printer information from the scanner, the EWS of the printer transfers the page data relating to printer information to the scanner through the network I/F (step S705).

Upon the scanner receiving the page data relating to printer information from the printer, the device information processor of the scanner adds the page data to the scanner setting page (step S706).

When the PC requests the scanner for the scanner setting page (step S707), and the scanner receives the request for the scanner setting page from the PC, the EWS of the scanner transfers the scanner setting page to the PC (step S708).

Upon receiving the scanner setting page from the scanner, the PC displays the scanner setting page (step S709).

If the PC changes the printer information on the page describing the printer information added to the scanner setting page, the PC will instruct the scanner to change the printer information (step S710).

Upon the scanner receiving the instruction to change the printer information from the PC, the device information processor of the scanner instructs the printer to change the printer information (step S711).

Upon the printer receiving the instruction to change the printer information from the scanner, the printer information processor of the printer changes the printer information according to the instruction (step S712).

Figure 8:
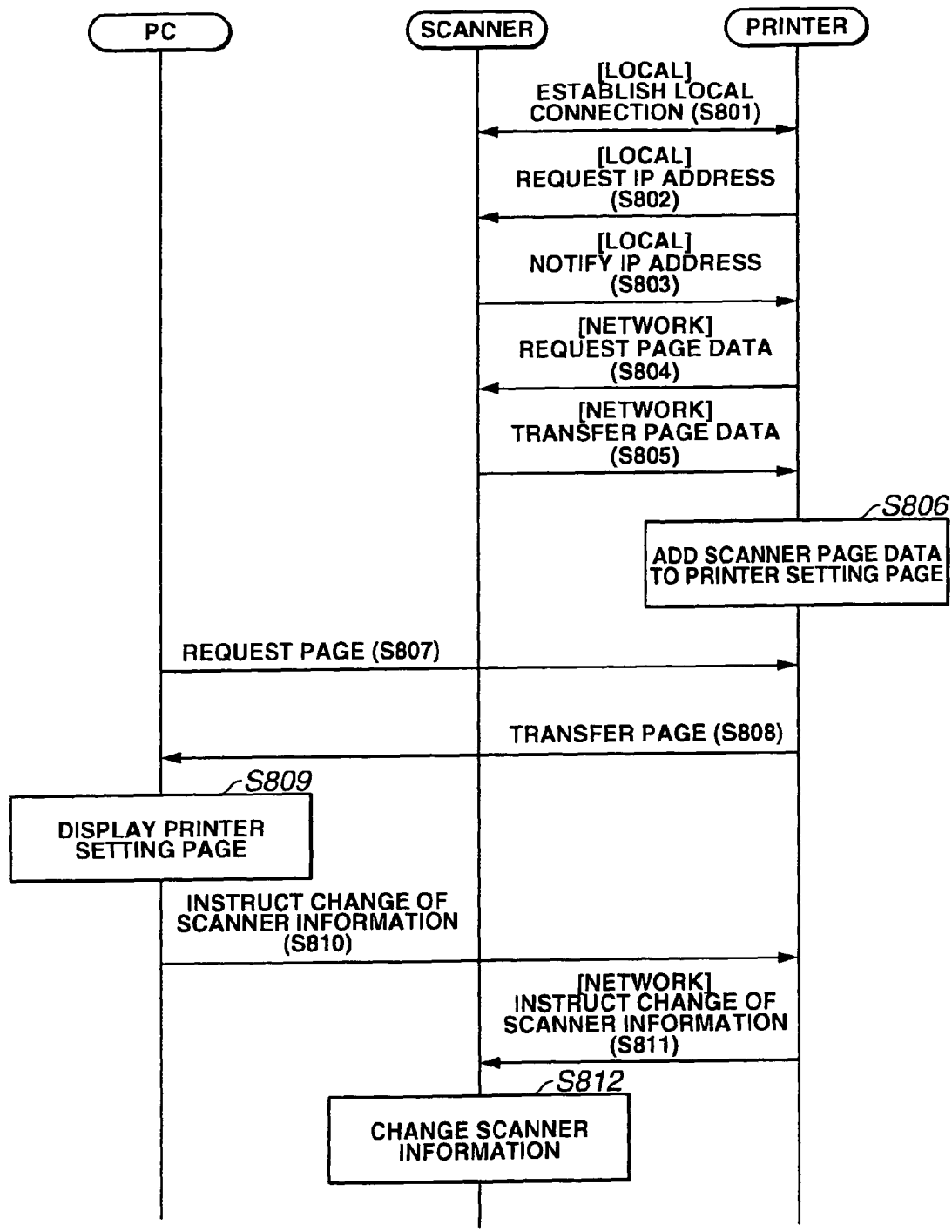
FIG. 8 is a sequence diagram illustrating the sequence of processing steps of the PC, the scanner, and the printer in the device link system according to the second embodiment.

A description will now be made on the sequence of processing steps of the PC, the scanner, and the printer of the device link system, with reference to the sequence diagram of FIG. 8. FIG. 8 shows the sequence of processing steps in terms of a case in which a web page describing printer information to be transferred by the printer's EWS (hereafter, to be referred to as the "printer setting page") is transferred to the PC after adding page data relating to scanner information thereto.

When the scanner and the printer are connected to each other through a USB cable, local connection is established between the scanner and the printer through the local I/F (step S801).

The IP address processor of the printer requests the scanner for the IP address of the scanner through the local I/F (step S802).

Upon the scanner receiving the request for the IP address from the printer, the IP address processor of the scanner notifies the printer of the IP address through the local I/F (step S803).

Upon the printer receiving the IP address from the scanner, the device processor of the printer requests the scanner for page data relating to scanner information through the network I/F, based on the IP address thus received (step S804).

Upon the scanner receiving the request for page data relating to scanner information from the printer, the EWS of the scanner transfers the page data relating to the scanner information to the printer through the network I/F (step S805).

Upon the printer receiving the page data relating to the scanner information from the scanner, the device information processor of the printer adds the page data to the printer setting page (step S806).

When the PC requests the printer for the printer setting page (step S807), and the printer receives the request for the printer setting page from the PC, the EWS of the printer transfers the printer setting page to the PC (step S808).

Upon receiving the printer setting page from the printer, the PC displays the printer setting page (step S809).

If the PC changes the scanner information on the page describing the scanner information added to the printer setting page, the PC will instruct the printer to change the scanner information (step S810).

Upon the printer receiving the instruction to change the scanner information from the PC, the device information processor of the printer instructs the scanner to change the scanner information (step S811).

Upon the scanner receiving the instruction to change the scanner information from the printer, the scanner information processor of the scanner changes the scanner information according to the instruction (step S812).

Figure 9:
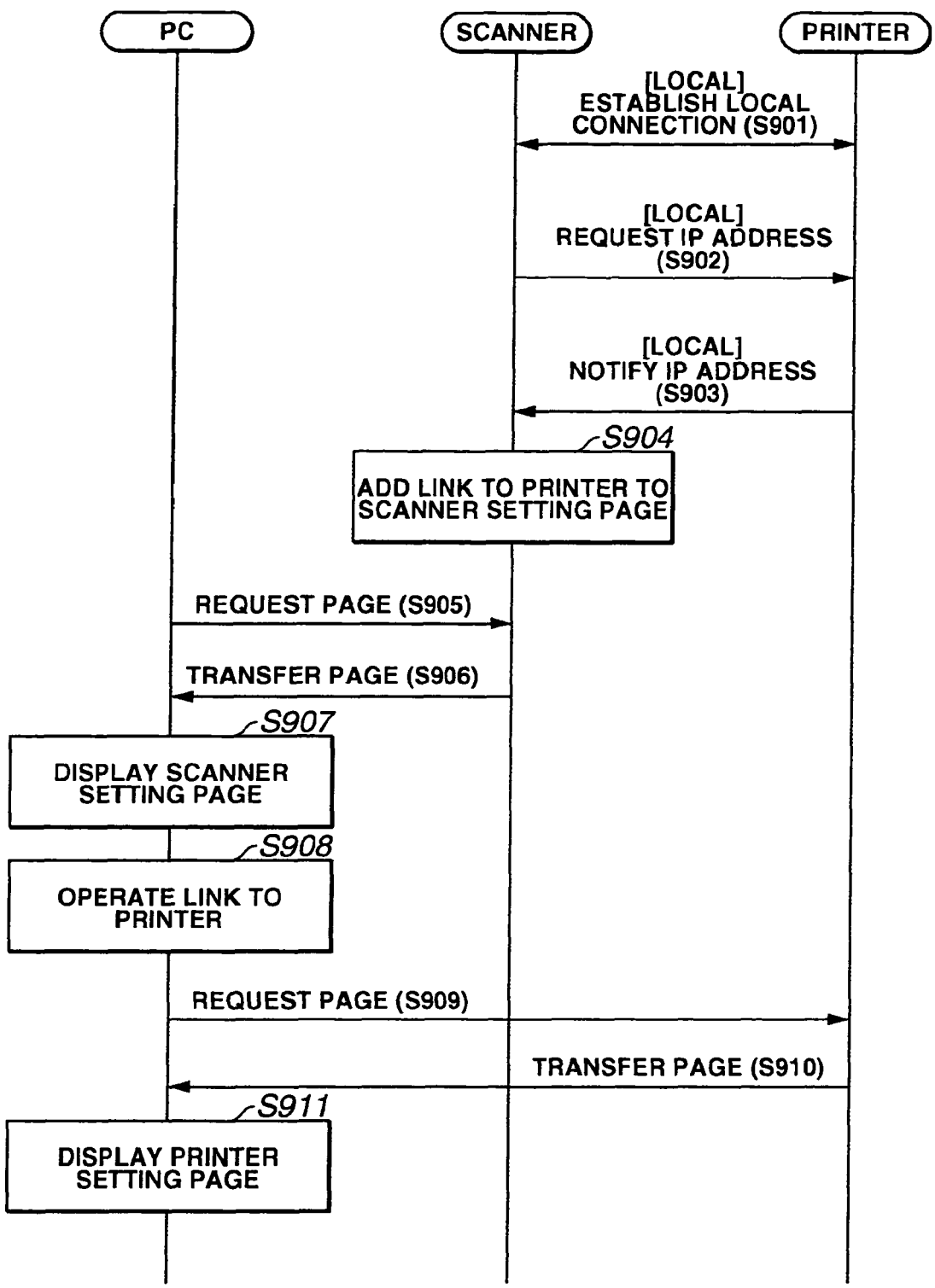
FIG. 9 is a sequence diagram illustrating the sequence of processing steps of the PC, the scanner, and the printer in the device link system according to the second embodiment.

A description will now be made of the sequence of processing steps of the PC, the scanner, and the printer of the device link system, with reference to the sequence diagram of FIG. 9. FIG. 9 shows the sequence of processing steps in terms of a case in which the scanner setting page having a link to the printer attached thereto is transferred to the PC by the EWS of the scanner.

When the scanner and the printer are connected to each other through a USB cable, local connection is established between the scanner and the printer through the local I/F (step S901).

The IP address processor of the scanner requests the printer for the IP address of the printer through the local I/F (step S902).

Upon the printer receiving the request for the IP address from the scanner, the IP address processor of the printer notifies the scanner of the IP address through the local I/F (step S903).

Upon the scanner receiving the IP address from the printer, the device information processor of the scanner attaches a link to the printer (that is, the IP address of the printer) to the scanner setting page (step S904).

When the PC request the scanner for the scanner setting page (step S905), and the scanner receives the request for the scanner setting page from the PC, the EWS of the scanner transfers the scanner setting page to the PC (step S906).

Upon receiving the scanner setting page from the scanner, the PC displays the scanner setting page (step S907).

When the PC operates (clicks, for example) the link to the printer on the scanner setting page (step S908), the PC requests the printer for the printer setting page (step S909).

Upon the printer receiving the request for the printer setting page from the PC, the EWS of the printer transfers the printer setting page to the PC (step S910).

Upon receiving the printer setting page from the printer, the PC displays the printer setting page (step 911).

A description will now be made on scanner setting pages managed by the EWS, with reference to FIGS. 10A to 10C.

Figure 10A:
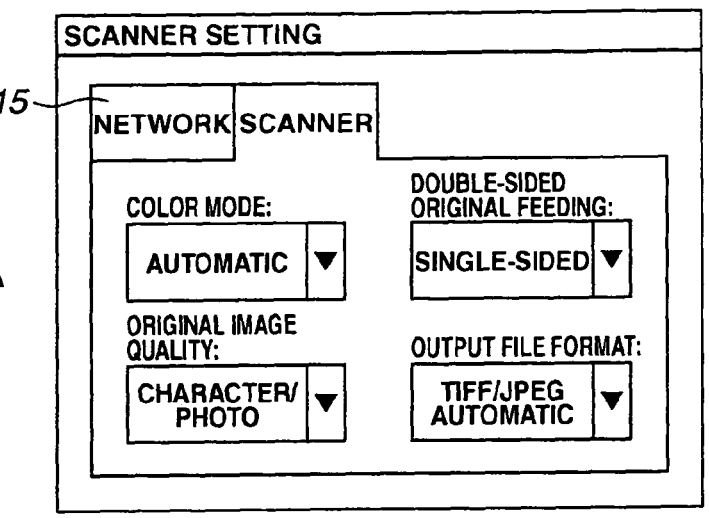
FIGS. 10A to 10C are diagrams illustrating scanner setting pages managed by the EWS according to the second embodiment.

FIG. 10A shows an example of the scanner setting page managed by the EWS of the scanner that is not connected to the printer.

As shown in FIG. 10A, the scanner setting page displays a page relating to scanner information. There are displayed, on this page, a combo box for setting a color mode, a combo box for setting double-sided original feeding function, a combo box for setting an image quality of the original document, and a combo box for setting an output file format. A "network" tab 15 can be operated (clicked, for example) to switch over the display of the scanner setting page to a page relating to the network.

Figure 10B:
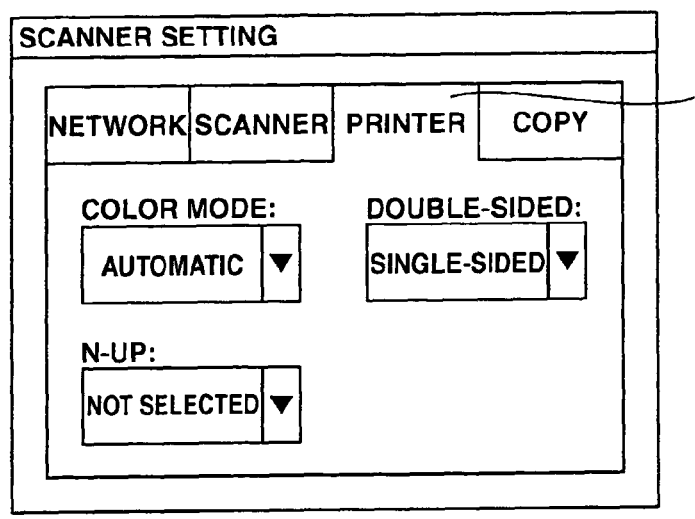

FIG. 10B shows an example of a scanner setting page managed by the EWS of the scanner connected to the printer.

When connected to the printer, the scanner acquires page data relating to printer information from the printer, and adds the acquired page data relating to printer information to the scanner setting page.

As shown in FIG. 10B, a "printer" tab 16 can be operated to switch the display of the scanner setting page to a page relating to the printer information. There are displayed, on this page, a combo box for setting a color mode, a combo box for setting double-sided printing, and a combo box for setting N-up function. Accordingly, the user is allowed to check or change the settings of the printer information, on the scanner setting page provided by the scanner's EWS.

Further, the scanner-printer system is often used as a substitution for a copying machine. Therefore, a page relating to copy setting information and copy job history (hereafter, to be collectively referred to as the "copy information") of the copy job performed by the scanner-printer system may be added as shown FIG. 10B.

Instead of adding the page data relating to printer information to the scanner setting page, a link to the printer (that is, the IP address of the printer) may be attached to the scanner setting page. In this case, the "printer" tab on the scanner setting page shown in FIG. 10B serves as the link to the printer, and operation of this "printer" tab will cause the EWS of the printer to receive the printer setting page as shown in FIG. 10C.

Figure 10C:
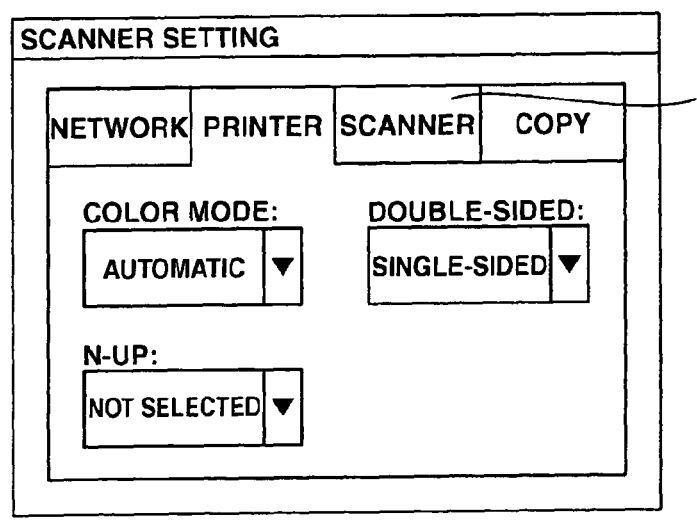

When a "scanner tab" 19 on the printer setting page shown in FIG. 10C serves as a link to the scanner, operation of this scanner tab will cause the EWS of the scanner to receive the scanner setting page.

As described above, according to a first aspect of the present invention, a device link system connects a first device and a second device through a communication interface, wherein the first device comprises a network connection unit that connects the first device to a network; a web server that delivers a web page describing first device information relating to the first device via the network connection unit; an acquisition unit that acquires second device information relating to the second device from the second device via the communication interface; and a web page processor that generates a page describing the second device information acquired by the acquisition unit and adds the generated page to the web page, and wherein the second device comprises a provision unit that provides the second device information to the first device via the communication interface upon receiving a request for the second device information from the first device.

According to the second aspect of the present invention, when the first device receives an instruction to the second device from a destination to which the web server has transmitted the web page having the page describing the second device information added thereto, the first device may transfer the instruction to the second device via the communication interface, and the second device may perform processing according to the instruction upon receiving the instruction from the first device.

According to the third aspect of the present invention, a device link system connects a first device and a second device through a communication interface, wherein the first device comprises a first network connection unit that connects the first device to a network; a first web server that delivers a web page describing first device information relating to the first device via the first network connection unit; a first network address acquisition unit that acquires the network address of the second device from the second device via the communication interface; a first page acquisition unit that acquires a page describing second device information relating to the second device from the second device via the first network connection unit, based on the network address of the second device acquired by the first network address acquisition unit; a first web page processor that adds the page describing the second device information acquired by the first page acquisition unit to the web page; and a first provision unit that, upon receiving a request for a network address of the first device from the second device, provides the network address to the second device via the communication interface, and the second device comprises a second network connection unit that connects the second device to the network; a second web server that delivers a web page describing second device information relating to the second device via the second network connection unit; a second network address acquisition unit that acquires the network address of the first device from the first device via the communication interface; a second page acquisition unit that acquires a page describing first device information relating to the first device from the first device via the second network connection unit, based on the network address of the first device acquired by the second network address acquisition unit; a second web page processor that adds the page describing the first device information acquired by the second page acquisition unit to the web page; and a second provision unit that, upon receiving a request for a network address of the second device from the first device, provides the network address to the first device via the communication interface, wherein the first web server of the first device provides a page describing the first device information to the second device via the first network connection unit, upon receiving a request for the page from the second device, and the second web server of the second device provides a page describing the second device information to the first device via the second network connection unit, upon receiving a request for the page from the first device.

According to the fourth aspect of the present invention, in the device link system according to the third aspect, when the first device receives an instruction to the second device from a destination to which the first web server has transmitted a web page having the page describing the second device information added thereto, the first device may transfer the instruction to the second device via the first network connection unit, and the second device may perform processing according to the instruction upon receiving the instruction from the first device.

According to the fifth aspect of the present invention, in the device link system according to the third aspect, when the second device receives an instruction to the first device from a destination to which the second web server has transmitted a web page having the page describing the first device information added thereto, the second device may transfer the instruction to the first device via the second network connection unit, and the first device may perform processing according to the instruction upon receiving the instruction from the second device.

According to a sixth aspect of the present invention, a device link system connects a first device and a second device through a communication interface, wherein the first device comprises a first network connection unit that connects the first device to a network; a first web server that delivers a web page describing first device information relating to the first device via the first network connection unit; a first acquisition unit that acquires the network address of the second device from the second device via the communication interface; a first web page processor that attaches the network address of the second device acquired by the first acquisition unit to the web page; and a first provision unit that, upon receiving a request for a network address of the first device from the second device, provides the network address to the second device via the communication interface, and the second device comprises a second network connection unit that connects the second device to the network; a second web server that delivers a web page describing second device information relating to the second device via the second network connection unit; a second acquisition unit that acquires the network address of the first device from the first device via the communication interface; a second web page processor that attaches the network address of the first device acquired by the second acquisition unit to the web page; and a second provision unit that, upon receiving a request for a network address of the second device from the first device, provides the network address to the first device via the communication interface, and wherein, when the first web server of the first device receives, from a destination to which the second web server of the second device has transmitted a web page having the network address of the first device attached thereto, a request for a web page describing the first device information based on the network address of the first device, the first web server of the first device transmits the web page to the destination via the first network connection unit, and when the second web server of the second device receives, from a destination to which the first web server of the first device has transmitted a web page having the network address of the second device attached thereto, a request for a web page describing the second device information based on the network address of the second device, the second web server of the second device transmits the web page to the destination via the second network connection unit.

According to a seventh aspect of the present invention, a device connected to another device through a communication interface comprises a network connection unit that connects the device to a network; a web server that delivers a web page describing first device information relating to the device via the network connection unit; an acquisition unit that acquires second device information relating to the another device from the another device via the communication interface; and a web page processor that generates a page describing the second device information acquired by the acquisition unit, and adds the generated page to the web page.

According to an eighth aspect of the present invention, in the device according to the seventh aspect, upon receiving an instruction to the another device from a destination to which the web server has transmitted a web page having the page describing the second device information added thereto, the device may cause the another device to perform processing according to the instruction.

According to a ninth aspect of the present invention, a device connected to another device through a communication interface comprises a network connection unit that connects the device to a network; a web server that delivers a web page describing first device information relating to the device via the network connection unit; a network address acquisition unit that acquires the network address of the another device from the another device via the communication interface; a page acquisition unit that acquires a page describing second device information relating to the another device from the another device via the network connection unit, based on the network address of the another device acquired by the network address acquisition unit; a web page processor that adds the page describing the second device information acquired by the page acquisition unit to the web page; a network address provision unit that, upon receiving a request for a network address of the device from the another device, provides the network address to the another device via the communication interface; and a page provision unit that, upon receiving a request for a page describing the first device information from the another device, provides the page to the another device via the communication interface, the web server providing a page describing the first device information to the another device via the network connection unit, upon receiving a request for the page from the another device.

According to a tenth aspect of the present invention, in the device according to the ninth aspect, when receiving an instruction to the another device from a destination to which the web server has transmitted a web page having the page describing the second device information, the device may cause the another device to perform processing according to the instruction.

According to an eleventh aspect of the present invention, a device connected to another device through a communication interface comprises a network connection unit that connects the device to a network; a web server that delivers a web page describing first device information relating to the device via the network connection unit; an acquisition unit that acquires the network address of the another device from the another device via the communication interface; a web page processor that attaches the network address of the another device acquired by the acquisition unit to the web page; and a provision unit that, upon receiving a request for a network address of the device from the another device, provides the network address to the another device via the communication interface, wherein, when the web server receives, from a destination to which the another device has transmitted a web page having the network address of the device attached thereto, a request for a web page describing the first device information based on the network address of the device, the web server transmits the web page to the destination via the network connection unit.

According to a twelfth aspect of the present invention, a device link method for a first device and a second device that are connected to each other through a communication interface comprises connecting, by a network connection unit of the first device, the first device to a network; requesting, by an acquisition unit of the first device, the second device for second device information relating to the second device via the communication interface; providing, by a provision unit of the second device, the second device information to the first device via the communication interface; generating, by a web page processor of the first device, a page describing the second device information provided by the second device, and adds the generated page to a web page describing first device information relating to the first device; and delivering, by a web server of the first device, the web page having the page describing the second device information added by the web page processor via the network connection unit.

According to a thirteenth aspect of the present invention, the device link method according to the twelfth aspect may further comprise transferring, from the first device, the instruction to the second device via the communication interface, when the first device receives an instruction to the second device from a destination to which the web server has transmitted a web page having the page describing the second device information added thereto; and performing, by the second device, processing according to the instruction upon receiving the instruction from the first device.

According to a fourteenth aspect of the present invention, a device link method for a first device and a second device that are connected to each other through a communication interface comprises connecting, by a first network connection unit, the first device to a network; connecting, by a second network connection unit, the second device to the network; requesting, by a first network address acquisition unit of the first device, the second device for a network address of the second device via the communication interface; providing, by a second provision unit of the second device, the network address of the second device to the first device via the communication interface; requesting, by a first page acquisition unit of the first device, the second device for a page describing second device information relating to the second device via the first network connection unit, based on the network address of the second device provided by the second device; providing, by a second web server of the second device, a page describing the second device information to the first device via the second network connection unit; adding, by a first web page processor of the first device, the page describing the second device information provided by the second device to a web page describing first device information relating to the first device; and delivering, by a first web server of the first device, the web page having the page describing the second device information added by the first web page processor via the first network connection unit.

According to a fifteenth aspect of the present invention, the device link method according to the fourteenth aspect may further comprises transferring, from the first device, the instruction to the second device via the first network connection unit, wherein, when the first device receives an instruction to the second device from a destination to which the first web server has transmitted a web page having the page describing the second device information added thereto; and performing, by the second device, processing according to the instruction upon receiving the instruction from the first device.

According to a sixteenth aspect of the present invention, the device link method according to the fourteenth aspect may further comprises requesting, by a second network address acquisition unit of the second device, the first device for a network address of the first device via the communication interface; providing, by a first provision unit of the first device, the network address of the first device to the second device via the communication interface; requesting, by a second page acquisition unit of the second device, the first device for a page describing first device information relating to the first device via the second network connection unit, based on the network address of the first device provided by the first device; providing, by the first web server of the first device, a page describing the first device information to the second device via the first network connection unit; adding, by a second web page processor of the second device, the page describing the first device information provided by the first device to a web page describing second device information relating to the second device; and delivering, by the second web server, the web page having the page describing the first device information added by the second web page processor via the second network connection unit.

According to a seventeenth aspect of the present invention, the device link method according to the sixteenth aspect may further comprises transferring, from the second device, the instruction to the first device via the second network connection unit, when the second device receives an instruction to the first device from a destination to which the second web server has transmitted a web page having the page describing the first device information added thereto; and performing, by the first device, processing according to the instruction upon receiving the instruction from the second device.

According to an eighteenth aspect of the present invention, a device link method for a first device and a second device that are connected to each other through a communication interface comprises connecting, by a first network connection unit, the first device to a network; connecting, by a second network connection unit, the second device to the network; requesting, by a first network address acquisition unit of the first device, the second device for a network address of the second device via the communication interface; providing, by a second provision unit of the second device, the network address of the second device to the first device via the communication interface; attaching, by a first web page processor of the first device, the network address of the second device provided by the second device to a web page describing first device information relating to the first device; delivering, by a first web server of the first device, the web page having the network address of the second device attached by the first web page processor via the first network connection unit; and transmitting, from the second device, the web page to the destination via the second network connection unit, when a second web server of the second device receives a request for a web page describing the second device information based on the network address from a destination to which the first web server of the first device has transmitted the web page having the network address of the second device attached thereto.

According to a nineteenth aspect of the present invention, the device link method according to the eighteenth aspect may further comprises requesting, by a second network address acquisition unit of the second device, the first device for a network address of the first device via the communication interface; providing, by a first provision unit of the first device, the network address of the first device to the second device via the communication interface; attaching, by a second web page processor of the second device, the network address of the first device provided by the first device to a web page describing second device information relating to the second device; delivering, by the second web server, the web page having the network address of the first device attached by the second web page processor via the second network connection unit; and transmitting, from the first device, the web page to the destination via the first network connection unit, when the first web server receives a request for a web page describing the first device information based on the network address from a destination to which the second web server of the second device has transmitted the web page having the network address of the first device attached thereto.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-266960 filed on Sep. 14, 2005 including specification, claims, drawings and abstract is incorporated herein by reference in its entirety.

What is claimed is:

1. A device link system for connecting a first device and a second device through a communication interface, wherein
the first device comprises:
a network connection unit that connects the first device to a network;
a web server that delivers a web page describing first device information relating to the first device via the network connection unit;
an acquisition unit that acquires second device information relating to the second device from the second device via the communication interface; and
a web page processor that generates a page describing the second device information acquired by the acquisition unit and adds the generated page to the web page, and
wherein the second device comprises:
a provision unit that provides the second device information to the first device via the communication interface upon receiving a request for the second device information from the first device.

2. The device link system according to claim 1, wherein, when the first device receives an instruction to the second device from a destination to which the web server has transmitted the web page having the page describing the second device information added thereto, the first device transfers the instruction to the second device via the communication interface, and
the second device performs processing according to the instruction upon receiving the instruction from the first device.

3. A device link system for connecting a first device and a second device through a communication interface, wherein
the first device comprises:
a first network connection unit that connects the first device to a network;
a first web server that delivers a web page describing first device information relating to the first device via the first network connection unit;
a first network address acquisition unit that acquires the network address of the second device from the second device via the communication interface;
a first page acquisition unit that acquires a page describing second device information relating to the second device from the second device via the first network connection unit, based on the network address of the second device acquired by the first network address acquisition unit;
a first web page processor that adds the page describing the second device information acquired by the first page acquisition unit to the web page; and
a first provision unit that, upon receiving a request for a network address of the first device from the second device, provides the network address to the second device via the communication interface, and
the second device comprises:
a second network connection unit that connects the second device to the network;
a second web server that delivers a web page describing second device information relating to the second device via the second network connection unit;
a second network address acquisition unit that acquires the network address of the first device from the first device via the communication interface;
a second page acquisition unit that acquires a page describing first device information relating to the first device from the first device via the second network connection unit, based on the network address of the first device acquired by the second network address acquisition unit;
a second web page processor that adds the page describing the first device information acquired by the second page acquisition unit to the web page; and
a second provision unit that, upon receiving a request for a network address of the second device from the first device, provides the network address to the first device via the communication interface,
wherein the first web server of the first device provides a page describing the first device information to the second device via the first network connection unit, upon receiving a request for the page from the second device, and
the second web server of the second device provides a page describing the second device information to the first device via the second network connection unit, upon receiving a request for the page from the first device.

4. The device link system according to claim 3, wherein, when the first device receives an instruction to the second device from a destination to which the first web server has transmitted a web page having the page describing the second device information added thereto, the first device transfers the instruction to the second device via the first network connection unit, and
the second device performs processing according to the instruction upon receiving the instruction from the first device.

5. The device link system according to claim 3, wherein, when the second device receives an instruction to the first device from a destination to which the second web server has transmitted a web page having the page describing the first device information added thereto, the second device transfers the instruction to the first device via the second network connection unit, and
the first device performs processing according to the instruction upon receiving the instruction from the second device.

6. A device link system for connecting a first device and a second device through a communication interface, wherein
the first device comprises:
a first network connection unit that connects the first device to a network;
a first web server that delivers a web page describing first device information relating to the first device via the first network connection unit;

a first acquisition unit that acquires the network address of the second device from the second device via the communication interface;

a first web page processor that attaches the network address of the second device acquired by the first acquisition unit to the web page; and a first provision unit that, upon receiving a request for a network address of the first device from the second device, provides the network address to the second device via the communication interface, and the second device comprises:

a second network connection unit that connects the second device to the network;

a second web server that delivers a web page describing second device information relating to the second device via the second network connection unit;

a second acquisition unit that acquires the network address of the first device from the first device via the communication interface;

a second web page processor that attaches the network address of the first device acquired by the second acquisition unit to the web page; and a second provision unit that, upon receiving a request for a network address of the second device from the first device, provides the network address to the first device via the communication interface, and wherein, when the first web server of the first device receives, from a destination to which the second web server of the second device has transmitted a web page having the network address of the first device attached thereto, a request for a web page describing the first device information based on the network address of the first device, the first web server of the first device transmits the web page to the destination via the first network connection unit, and when the second web server of the second device receives, from a destination to which the first web server of the first device has transmitted a web page having the network address of the second device attached thereto, a request for a web page describing the second device information based on the network address of the second device, the second web server of the second device transmits the web page to the destination via the second network connection unit.

7. A device connected to another device through a communication interface, comprising:

a network connection unit that connects the device to a network;

a web server that delivers a web page describing first device information relating to the device via the network connection unit;

an acquisition unit that acquires second device information relating to the another device from the another device via the communication interface; and a web page processor that generates a page describing the second device information acquired by the acquisition unit, and adds the generated page to the web page.

8. The device according to claim 7, wherein, upon receiving an instruction to the another device from a destination to which the web server has transmitted a web page having the page describing the second device information added thereto, the device causes the another device to perform processing according to the instruction.

9. A device connected to another device through a communication interface, comprising:

a network connection unit that connects the device to a network;

a web server that delivers a web page describing first device information relating to the device via the network connection unit;

a network address acquisition unit that acquires the network address of the another device from the another device via the communication interface;

a page acquisition unit that acquires a page describing second device information relating to the another device from the another device via the network connection unit, based on the network address of the another device acquired by the network address acquisition unit;

a web page processor that adds the page describing the second device information acquired by the page acquisition unit to the web page;

a network address provision unit that, upon receiving a request for a network address of the device from the another device, provides the network address to the another device via the communication interface; and a page provision unit that, upon receiving a request for a page describing the first device information from the another device, provides the page to the another device via the communication interface, the web server providing a page describing the first device information to the another device via the network connection unit, upon receiving a request for the page from the another device.

10. The device according to claim 9, wherein, when receiving an instruction to the another device from a destination to which the web server has transmitted a web page having the page describing the second device information, the device causes the another device to perform processing according to the instruction.

11. A device connected to another device through a communication interface, comprising:

a network connection unit that connects the device to a network;

a web server that delivers a web page describing first device information relating to the device via the network connection unit;

an acquisition unit that acquires the network address of the another device from the another device via the communication interface;

a web page processor that attaches the network address of the another device acquired by the acquisition unit to the web page; and a provision unit that, upon receiving a request for a network address of the device from the another device, provides the network address to the another device via the communication interface, wherein, when the web server receives, from a destination to which the another device has transmitted a web page having the network address of the device attached thereto, a request for a web page describing the first device information based on the network address of the device, the web server transmits the web page to the destination via the network connection unit.

12. A device link method for a first device and a second device that are connected to each other through a communication interface, comprising:

connecting, by a network connection unit of the first device, the first device to a network;

requesting, by an acquisition unit of the first device, the second device for second device information relating to the second device via the communication interface;

providing, by a provision unit of the second device, the second device information to the first device via the communication interface;

generating, by a web page processor of the first device, a page describing the second device information provided by the second device, and adds the generated page to a web page describing first device information relating to the first device; and delivering, by a web server of the first device, the web page having the page describing the second device information added by the web page processor via the network connection unit.

13. The device link method according to claim 12, further comprising:

transferring, from the first device, the instruction to the second device via the communication interface, when the first device receives an instruction to the second device from a destination to which the web server has transmitted a web page having the page describing the second device information added thereto; and performing, by the second device, processing according to the instruction upon receiving the instruction from the first device.

14. A device link method for a first device and a second device that are connected to each other through a communication interface, comprising:

connecting, by a first network connection unit, the first device to a network;

connecting, by a second network connection unit, the second device to the network;

requesting, by a first network address acquisition unit of the first device, the second device for a network address of the second device via the communication interface;

providing, by a second provision unit of the second device, the network address of the second device to the first device via the communication interface;

requesting, by a first page acquisition unit of the first device, the second device for a page describing second device information relating to the second device via the first network connection unit, based on the network address of the second device provided by the second device;

providing, by a second web server of the second device, a page describing the second device information to the first device via the second network connection unit;

adding, by a first web page processor of the first device, the page describing the second device information provided by the second device to a web page describing first device information relating to the first device; and delivering, by a first web server of the first device, the web page having the page describing the second device information added by the first web page processor via the first network connection unit.

15. The device link method according to claim 14, further comprising:

transferring, from the first device, the instruction to the second device via the first network connection unit wherein, when the first device receives an instruction to the second device from a destination to which the first web server has transmitted a web page having the page describing the second device information added thereto; and performing, by the second device, processing according to the instruction upon receiving the instruction from the first device.

16. The device link method according to claim 14, further comprising:

requesting, by a second network address acquisition unit of the second device, the first device for a network address of the first device via the communication interface;

providing, by a first provision unit of the first device, the network address of the first device to the second device via the communication interface;

requesting, by a second page acquisition unit of the second device, the first device for a page describing first device information relating to the first device via the second network connection unit, based on the network address of the first device provided by the first device;

providing, by the first web server of the first device, a page describing the first device information to the second device via the first network connection unit;

adding, by a second web page processor of the second device, the page describing the first device information provided by the first device to a web page describing second device information relating to the second device; and delivering, by the second web server, the web page having the page describing the first device information added by the second web page processor via the second network connection unit.

17. The device link method according to claim 16, further comprising:

transferring, from the second device, the instruction to the first device via the second network connection unit, when the second device receives an instruction to the first device from a destination to which the second web server has transmitted a web page having the page describing the first device information added thereto; and performing, by the first device, processing according to the instruction upon receiving the instruction from the second device.

18. A device link method for a first device and a second device that are connected to each other through a communication interface, comprising:

connecting, by a first network connection unit, the first device to a network;

connecting, by a second network connection unit, the second device to the network;

requesting, by a first network address acquisition unit of the first device, the second device for a network address of the second device via the communication interface;

providing, by a second provision unit of the second device, the network address of the second device to the first device via the communication interface;

attaching, by a first web page processor of the first device, the network address of the second device provided by the second device to a web page describing first device information relating to the first device;

delivering, by a first web server of the first device, the web page having the network address of the second device attached by the first web page processor via the first network connection unit; and transmitting, from the second device, the web page to the destination via the second network connection unit, when a second web server of the second device receives a request for a web page describing the second device information based on the network address from a destination to which the first web server of the first device has transmitted the web page having the network address of the second device attached thereto.

19. The device link method according to claim 18, further comprising:

requesting, by a second network address acquisition unit of the second device, the first device for a network address of the first device via the communication interface;

providing, by a first provision unit of the first device, the network address of the first device to the second device via the communication interface;

attaching, by a second web page processor of the second device, the network address of the first device provided by the first device to a web page describing second device information relating to the second device;

delivering, by the second web server, the web page having the network address of the first device attached by the second web page processor via the second network connection unit; and transmitting, from the first device, the web page to the destination via the first network connection unit, when the first web server receives a request for a web page describing the first device information based on the network address from a destination to which the second web server of the second device has transmitted the web page having the network address of the first device attached thereto.

* * * * *